United States Patent
Udono

(10) Patent No.: US 7,168,517 B2
(45) Date of Patent: Jan. 30, 2007

(54) THROTTLE VALVE OPENING CONTROL DEVICE AND LAYOUT STRUCTURE THEREOF

(75) Inventor: Takashi Udono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 10/814,197

(22) Filed: Apr. 1, 2004

(65) Prior Publication Data
US 2004/0244768 A1    Dec. 9, 2004

(30) Foreign Application Priority Data
Apr. 4, 2003   (JP) .............................. 2003-102195

(51) Int. Cl.
*F02D 41/00* (2006.01)
(52) U.S. Cl. ...................... 180/219; 123/399
(58) Field of Classification Search ................ 180/219; 123/399, 400, 478
See application file for complete search history.

(56) References Cited

U.S. PATENT DOCUMENTS 5,251,583 A * 10/1993 Shiohara ................... 123/73 D
5,960,752 A * 10/1999 Hirakata et al. ........ 123/65 PE

FOREIGN PATENT DOCUMENTS

JP       2002-256900 A      9/2002

* cited by examiner

*Primary Examiner*—Anne Marie Boehler
(74) *Attorney, Agent, or Firm*—Birch, Stewart, Kolasch & Birch, LLP

(57) ABSTRACT

A throttle valve opening control device includes a drum which is connected to a throttle grip by a wire, an input shaft which is integrally mounted in the drum, an output shaft which is connected to the input shaft by a power transmission device, a link mechanism which connects the output shaft to a forward valve shaft and a rear valve shaft, and a drive motor which drives the power transmission device to provide the relative rotation of the output shaft with respect to the input shaft. The input shaft and the output shaft have respective axes arranged along a straight line. The drive motor is arranged parallel to the output shaft, and the output shaft and the drive motor are juxtaposed vertically and substantially along a centerline of an intake passage. The throttle valve opening control device is relatively compact to reduce engine size.

20 Claims, 7 Drawing Sheets

THROTTLE VALVE OPENING CONTROL DEVICE AND LAYOUT STRUCTURE THEREOF

CROSS-REFERENCES TO RELATED APPLICATIONS

This nonprovisional application claims priority under 35 U.S.C. § 119(a) on Patent Application No. 2003-102195 filed in Japan on Apr. 4, 2003, the entirety of which is herein incorporated by reference.

BACKGROUND OF THE INVENTION

1. Field of the Invention

The present invention relates to a throttle valve opening control device, and more particularly to a throttle valve opening control device and the related layout structure within a motorcycle.

2. Description of the Background Art

Applicant has determined that the background art suffers from the following disadvantages. A throttle valve opening control device has been available for controlling openings of throttle valves using a drive motor, e.g., see Japanese Unexamined Patent Publication 2002-256900 (specifically pages 3 to 6; FIG. 9; and FIG. 10 of this document). FIG. 9 of this patent document is discussed hereinafter in conjunction with accompanying FIG. 7 of the present application, and FIG. 10 of this patent document is discussed in conjunction with FIG. 8 of the present application. However, as discussed in greater detail hereinafter, FIGS. 7 and 8 of the present application have been renumbered with different symbols.

FIG. 7 is a cross-sectional view showing a conventional throttle valve opening control device of the background art. As shown in FIG. 7, a front-side throttle body 302 is mounted on a front-side cylinder head 301 of a V-shaped engine, an intake passage 303 is formed in the front-side throttle body 302, a valve shaft 304 penetrates the intake passage 303, and a throttle valve 306 is mounted on the valve shaft 304. In the same manner, a rear-side throttle body 312 is mounted on a rear-side cylinder head 311, an intake passage 313 is formed in the rear-side throttle body 312, a valve shaft 314 penetrates the intake passage 313, and a throttle valve 316 is mounted on the valve shaft 314. A drive motor 317 that drives these throttle valves 306, 316 is arranged between the front-side throttle body 302 and the rear-side throttle body 312, e.g., between the throttle valves 306, 316.

FIG. 8 is a plan view showing the conventional throttle valve opening control device of the background art. FIG. 8 shows that the drive motor 317 is connected to the valve shaft 314 by way of a gear case 321 and, at the same time, the valve shaft 304 is connected to the valve shaft 314 by way of a link mechanism 322. By driving the valve shafts 304, 314 using the drive motor 317 as shown, the throttle valves 306, 316 can be opened and closed.

In mounting an engine on a vehicle body, particularly with respect to a motorcycle, a reduction in size of the engine is vitally important for the overall reduction of the space required for mounting the engine. The above-mentioned drive motor 317 shown in FIG. 7 and FIG. 8 is arranged between the front-side throttle body 302 and the rear-side throttle body 312. Accordingly, the present inventor has determined that it is difficult to further decrease a distance between the front-side throttle body 302 and the rear-side throttle body 312, e.g., as an attempt to miniaturize the engine. The present inventor has also determined if the front-side throttle body 302 and the rear-side throttle body 312 can be arranged closer to each other, an upper portion of the engine can be made more compact, and the engine can therefore be made smaller. In addition, by taking the layout and structure of the throttle valve opening control device into consideration, the further the engine's size can be reduced.

SUMMARY OF THE INVENTION

The present invention overcomes the shortcomings associated with the background art and achieves other advantages not realized by the background art.

It is an object of the present invention to reduce the size of an engine by improving the structure of a throttle valve opening control device.

One or more of these and other objects are accomplished by a throttle valve opening control device for an intake side of an engine, wherein the engine includes a plurality of intake passages formed in a throttle body, a plurality of valve shafts being provided in the throttle body, a plurality of throttle valves for opening and closing the intake passages are mounted on the valve shafts, whereby throttle valve openings are operatively controlled by a rotational movement of the valve shafts via a throttle grip, the throttle valve opening control device comprising a drum being connected to the throttle grip by a wire, an input shaft which is integrally mounted in the drum, an output shaft which is operatively connected to the input shaft by a power transmission device, a connecting member which connects the output shaft to the valve shafts, and an actuator which drives the power transmission device to provide the relative rotation of the output shaft with respect to the input shaft, wherein the input shaft and the output shaft have respective axes thereof arranged along a straight line, the actuator is arranged in a position parallel to the output shaft, and the output shaft and the actuator are juxtaposed substantially vertically along a centerline of the intake passage.

One or more of these and other objects are accomplished by a throttle valve opening control device for an engine having a throttle body formed on an intake side of the engine, a plurality of intake passages being formed in the throttle body, a plurality of valve shafts being provided in the throttle body, a plurality of throttle valves for opening and closing the intake passages being mounted on the valve shafts, the throttle valve opening control device comprising an input shaft being operatively connected to a throttle grip; an output shaft being connected to the input shaft by a power transmission device; a connecting member which connects the output shaft to the valve shafts, and an actuator which drives the power transmission device to provide a relative rotational movement of the output shaft with respect to the input shaft and via the throttle grip, wherein the intake passages are arranged in parallel in a fore-and-aft direction of the engine, the throttle valve opening control device is arranged above a plane which includes the respective valve shafts of the intake passages, and the rotational movement is transmitted from the output shaft to the valve shafts which are disposed below the output shaft.

One or more of these and other objects are accomplished by a throttle valve opening control device for an engine having a throttle body formed on an intake side of the engine, a plurality of intake passages being formed in the throttle body, a plurality of valve shafts being provided in the throttle body, a plurality of throttle valves for opening and closing the intake passages being mounted on the valve shafts, upper fuel injection valves for injecting fuel into an interior of the intake passages are arranged above the intake passages and lower fuel injection valves for injecting fuel into an interior of the engine are arranged at lower side portions of the intake passages, the throttle valve opening control device comprising an input shaft being operatively connected to a throttle grip; an output shaft being connected to the input shaft by a power transmission device; a connecting member which connects the output shaft to the valve shafts; and an actuator which drives the power transmission device to provide the relative rotation of the output shaft with respect to the input shaft; wherein the throttle valve opening control device is capable of being arranged between the upper fuel injection valves and the lower fuel injection valves.

By arranging the respective axes of the input shaft and the output shaft along the straight line and by vertically juxtaposing the output shaft and the actuator substantially along the centerline of the intake passage, it is possible to make the throttle valve opening control device more compact and, at the same time, it is possible to position the throttle valve opening control device closer to the throttle body.

The throttle valve opening control device can be positioned above the plane which includes the respective valve shafts of the intake passages. When compared to the conventional arrangement in which a motor for controlling openings of throttle valves is arranged between the throttle valves in front of and behind an engine, the front and rear intake passages of the present invention can be arranged closer to each other, and the throttle body and the associated engine can be made more compact.

The upper fuel injection valves can be arranged above the intake passages to bring respective upper portions of two intake passages closer to each other. Therefore, the throttle body can be made compact whereby it is possible to reduce the size of the engine in which the throttle valve opening control device is installed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
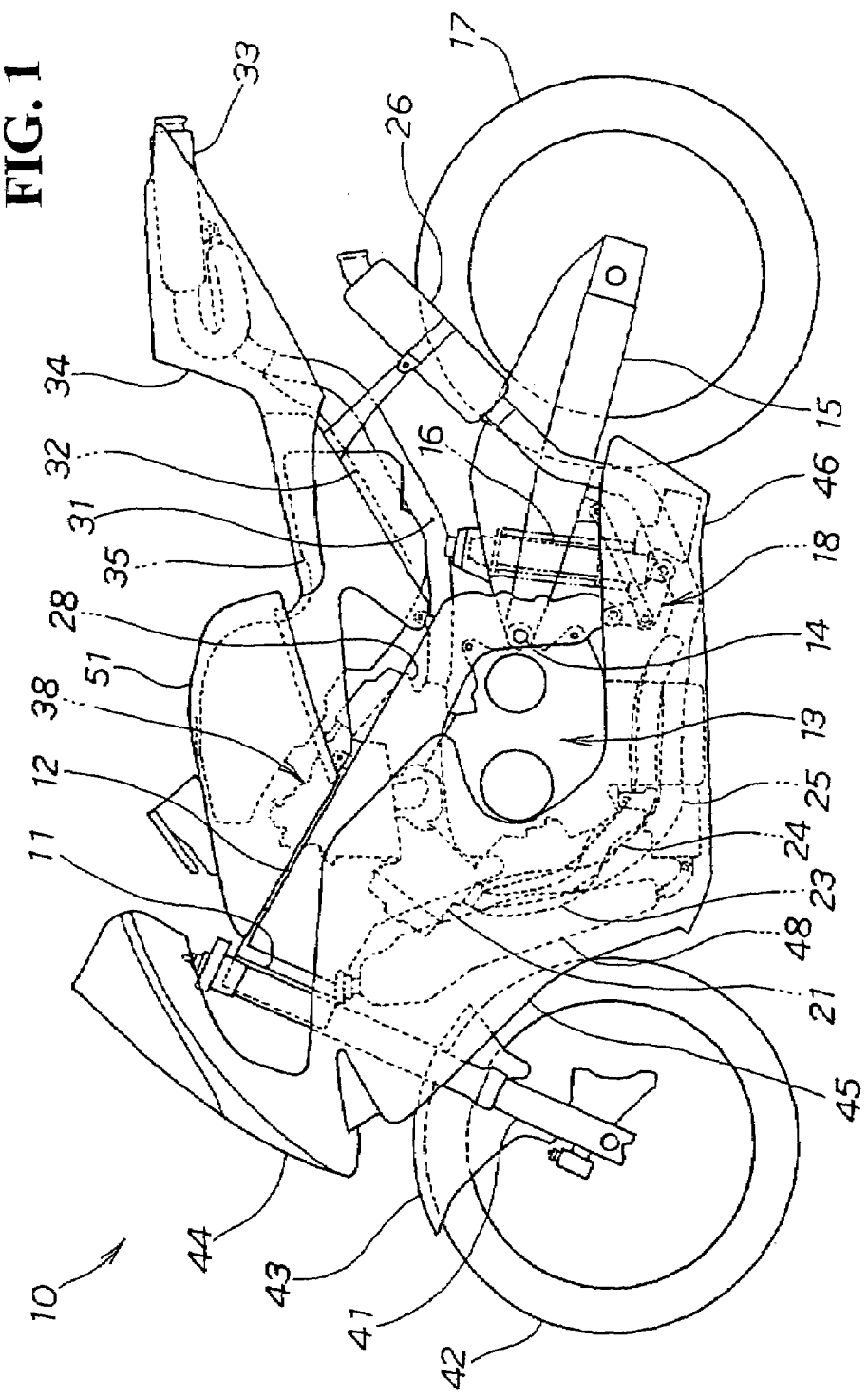
FIG. 1 is a side view of a motorcycle provided with a throttle valve opening control device according to an embodiment of the present invention.
Figure 2:
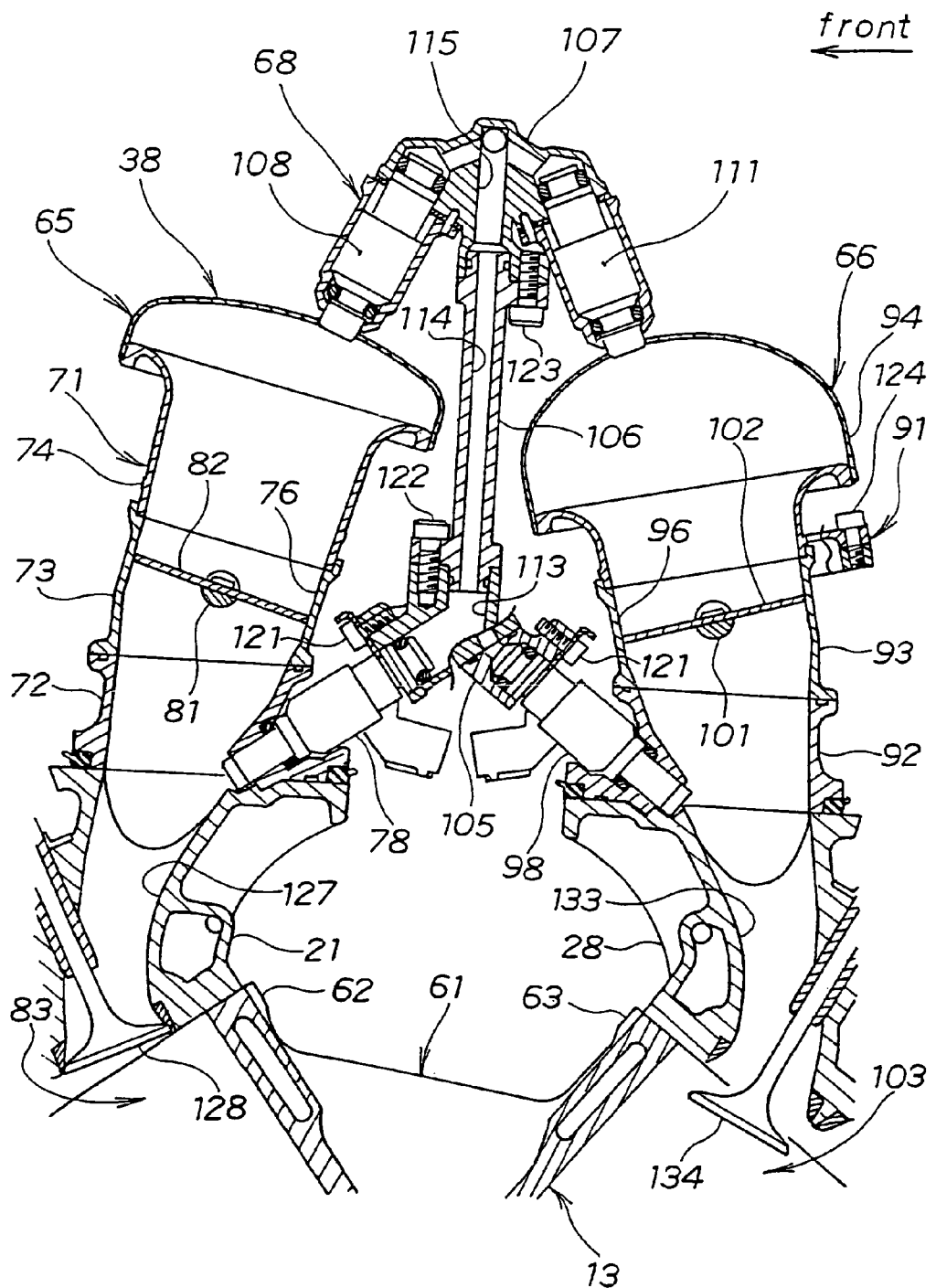
FIG. 2 is a cross-sectional view of an upper portion of an engine according to an embodiment of the present invention.
Figure 3:
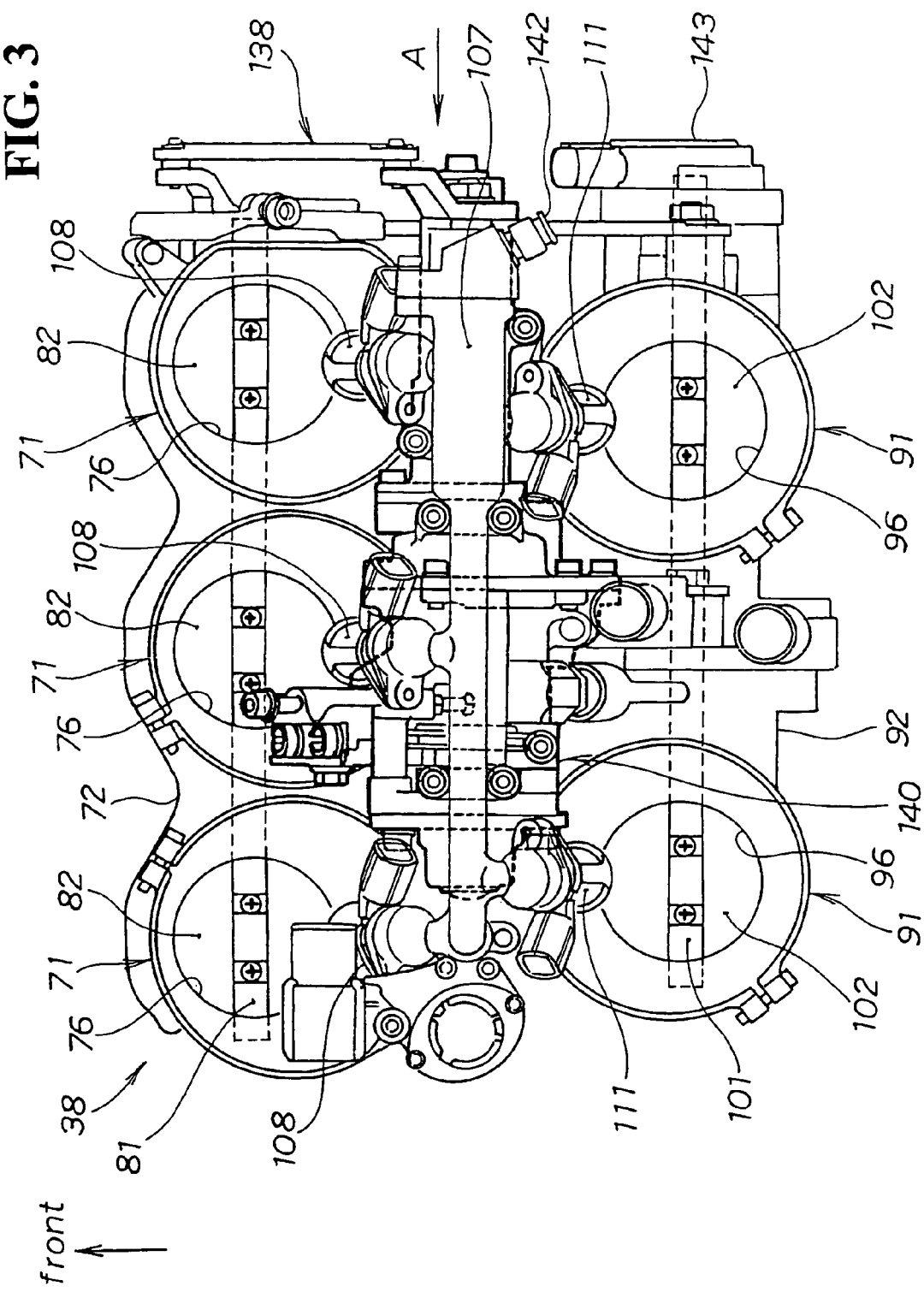
FIG. 3 is a plan view of a throttle body assembly body according to an embodiment of the present invention.
Figure 4:
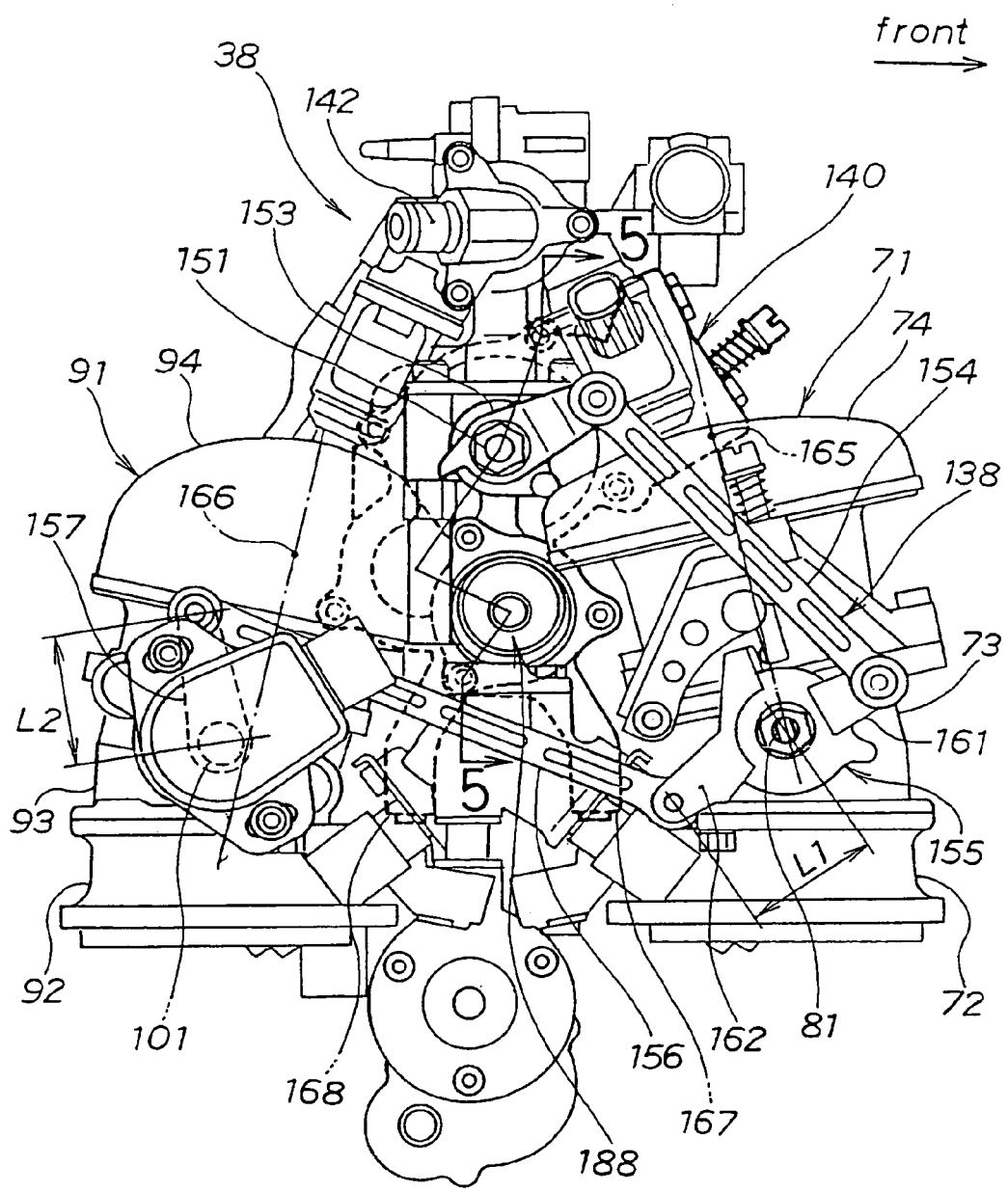
FIG. 4 is a side view of a throttle body assembly body according to an embodiment of the present invention.
Figure 5:
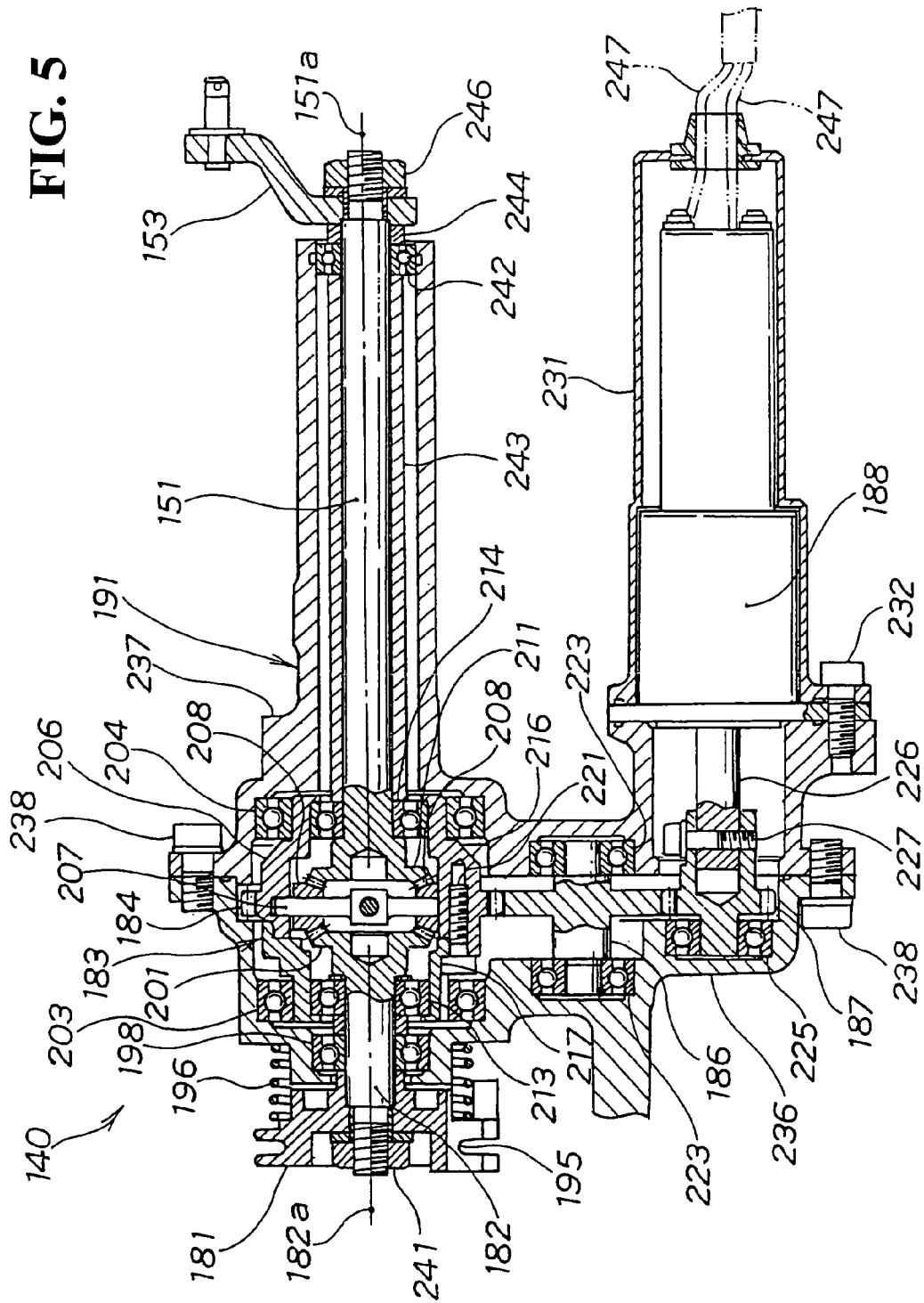
FIG. 5 is a cross-sectional view of a throttle control device according to an embodiment of the present invention.
Figure 6:
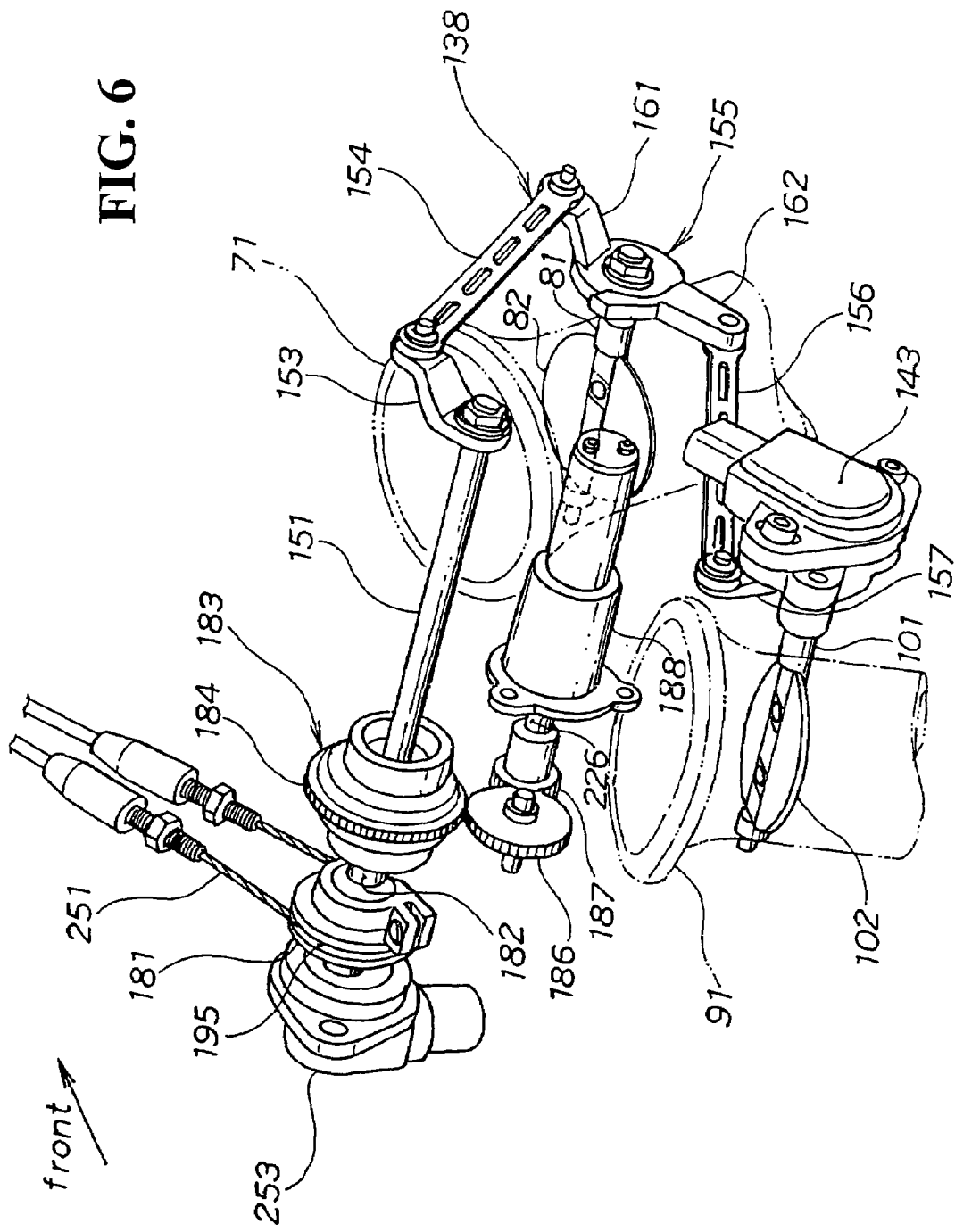
FIG. 6 is a perspective view showing the throttle control device according to an embodiment of the present invention.
Figure 7:
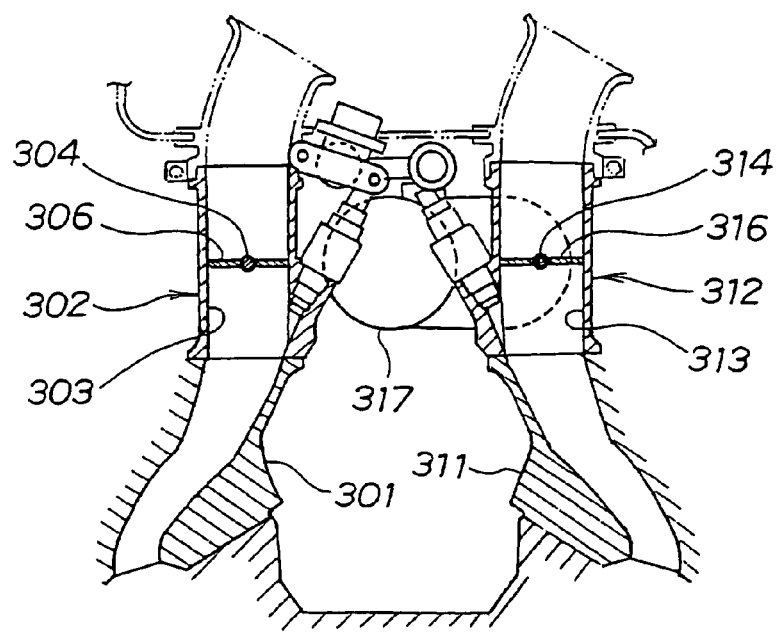
FIG. 7 is a cross-sectional view showing a conventional throttle valve opening control device of the background art.
Figure 8:
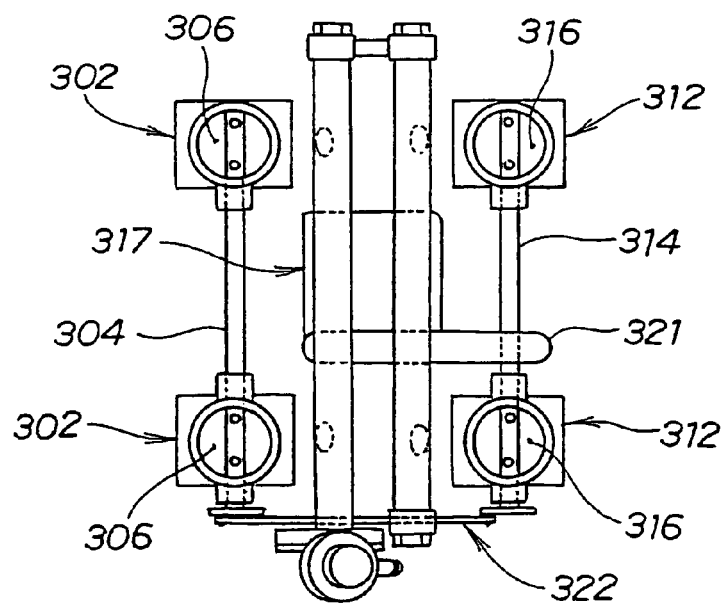
FIG. 8 is a plan view showing a conventional throttle valve opening control device of the background art.

The present invention will hereinafter be described with reference to the accompanying drawings. It is noted that the drawings should be observed in a direction that permits the symbols in each of the drawings to be read in their proper orientation. FIG. 1 is a side view of a motorcycle provided with a throttle valve opening control device according to an embodiment of the present invention. FIG. 2 is a cross-sectional view of an upper portion of an engine according to an embodiment of the present invention. FIG. 3 is a plan view of a throttle body assembly body according to an embodiment of the present invention. FIG. 4 is a side view of a throttle body assembly body according to an embodiment of the present invention. FIG. 5 is a cross-sectional view of a throttle control device according to an embodiment of the present invention. FIG. 6 is a perspective view showing the throttle control device according to an embodiment of the present invention.

FIG. 1 is a side view of a motorcycle that includes a throttle valve opening control device according to the present invention. The motorcycle 10 is a vehicle that includes a pair of left and right body frames (main frames) 12, 12 which form a vehicle body extending in a downward oblique direction toward a rear portion of the vehicle body (only the symbol which indicates the main frame 12 at a viewer or left side of the vehicle is shown in the drawing) from a head pipe 11. A V-type multi-cylinder, e.g., 5 cylinders, engine 13 (hereinafter abbreviated as "engine 13") is mounted on lower portions of the body frames 12, 12. A swing arm 15 is mounted on rear portions of the main frames 12, 12 by means of a pivot shaft 14 such that the swing arm 15 can swing upwardly and downwardly about the pivot shaft 14. An upper end of a rear cushion unit 16 is mounted on a front upper portion of the swing arm 15 and a rear wheel 17 is mounted on a rear end portion of the swing arm 15. A lower end of the rear cushion unit 16 is mounted on a rear lower end portion of the main frame 12 by way of a link device 18.

Exhaust pipes 23 to 25 are provided for respective cylinders, and extend rearwardly from cylinder heads 21 mounted on a front side of the engine 13. The exhaust pipes 23 to 25 merge and, thereafter, are connected to a left muffler 26 at a viewer side on the drawing. Exhaust pipes 31, 32 are also provided for respective cylinders, and are extended rearwardly from cylinder heads 28 mounted on a rear side of the engine 13. These exhaust pipes 31, 32 merge and, thereafter, are connected to a rear muffler 33 mounted on the rear portion of the vehicle body. A seat cowl 34 which also functions as a seat is extended rearwardly from upper portions of the body frames 12, 12 and a fuel tank 35 is mounted on the inside of the seat cowl 34.

The engine 13 is configured such that a throttle body assembly 38 is mounted between the cylinder heads 21, 28 and the throttle body assembly 38 includes the throttle valve opening control device of the present invention. A front fork 41 is rotatably mounted on the head pipe 11, a front wheel 42 is mounted on a lower end of the front fork 41, and a front fender 43 covers the front wheel 42 from above. An upper cowl 44, a middle cowl 45, a lower cowl 46, a radiator 48 and a tank cover 51 are also shown in FIG. 1.

FIG. 2 is a cross-sectional view of an upper portion of an engine according to an embodiment of the present invention. An arrow, designated "front" in the drawing, indicates the direction of a front side of a vehicle body in FIG. 2. A cylinder head 21 is mounted on a front cylinder 62 formed on a front portion of a cylinder block 61 formed in a V shape and a cylinder head 28 is mounted on a rear cylinder 63 formed on a rear portion of the cylinder block 61. The throttle body assembly 38 is mounted on these cylinder heads 21, 28.

The throttle body assembly 38 includes a front throttle body 65 that is mounted on the cylinder head 21, a rear throttle body 66 which is mounted on the cylinder head 28 and a fuel injection device 68 which is provided for injecting fuel into the front and rear throttle bodies 65, 66. The front throttle body 65 includes three cylindrical front throttle portions 71, wherein the front throttle portion 71 includes a throttle base 72 mounted on the cylinder head 21, a throttle portion body 73 which is mounted on an upper portion of the throttle base 72 and an air funnel 74 which is mounted on an upper portion of the throttle portion body 73. An intake passage 76 is formed in the inside of the throttle base 72, the throttle portion body 73 and the air funnel 74.

The throttle base 72 is a member having a sidewall on which a lower fuel injection valve 78 having a fuel injection device 68 is mounted. The throttle portion body 73 allows a forward valve shaft 81 to penetrate thereof in such a manner that the forward valve shaft 81 traverses the intake passage 76 and a throttle valve 82 that includes a butterfly valve is mounted on the forward valve shaft 81. By changing the opening of the throttle valve 82, a quantity of air and fuel which reaches a combustion chamber 83 of the engine after passing through the inside of the intake passage 76 can be adjusted.

The rear throttle body 66 includes two cylindrical rear throttle portions 91, wherein the rear throttle portion 91 includes a throttle base 92 mounted on the cylinder head 28, a throttle portion body 93 which is mounted on an upper portion of the throttle base 92 and an air funnel 94 which is mounted on an upper portion of the throttle portion body 93. An intake passage 96 is formed in the inside of these throttle base 92, the throttle portion body 93 and the air funnel 94. The throttle base 92 is a member having a sidewall on which a lower fuel injection valve 98 having a fuel injection device 68 is mounted. The throttle portion body 93 allows a rear valve shaft 101 to penetrate thereof in such a manner that the rear valve shaft 101 traverses the intake passage 96 and a throttle valve 102 having a butterfly valve is mounted on the rear valve shaft 101. By changing the opening of the throttle valve 102, a quantity of air and fuel which reaches a combustion chamber 103 of the engine after passing through the inside of the intake passage 96 can be adjusted.

The fuel injection device 68 includes the above-mentioned lower fuel injection valves 78 for respective front throttle portions 71, the lower fuel injection valves 98 formed for respective rear throttle portions 91, a lower valve support member 105 which supports these lower fuel injection valves 78, 98, fuel pipes 106, 106 which are mounted on the lower valve support member 105, an upper valve support member 107 which is mounted on these fuel pipes 106, 106, upper fuel injection valves 108 which are mounted on the upper valve support member 107 for injecting fuel into the respective intake mounted on the upper valve support member 107 for injecting fuel into the respective intake passages 96 of the rear throttle body 66.

The above-mentioned lower valve support member 105, the fuel pipes 106, 106 and the upper valve support member 107 are respectively members that define fuel passages 113, 114 and 115. The lower valve support member 105 is configured to be mounted on a connecting member (not shown in the drawing) that connects the throttle bases 72, 92. Removal preventing bolts 121 which prevent a removal of the lower fuel injection valves 78, 98 from the lower valve support member 105, bolts 122 for mounting the fuel pipe 106 on the lower valve support member 105, bolts 123 for mounting the upper valve support member 107 on the fuel pipe 106, bolts 124 for mounting the air funnel 94 to the throttle portion body 93, intake ports 127 which are communicated with the intake passages 76, intake valves 128 for opening or closing outlets of the intake ports 127, intake ports 133 which are communicated with the intake passages 96, and intake valves 134 which open or close outlets of the intake ports 133.

FIG. 3 is a plan view of the throttle body assembly according to the present invention. The throttle body assembly 38 includes the three front throttle portions 71 which are arranged in parallel in the vehicle width direction of the front cylinders 62, e.g., see FIG. 2, for respective cylinders, and also includes the rear throttle portions 91, e.g., two rear throttle portions 91 which are arranged in parallel in the vehicle width direction of the rear cylinders 91 (see FIG. 2) for respective cylinders. Further, the upper fuel injection valve 108 and the lower fuel injection valve 78 (see FIG. 2) are provided for each front throttle portion 71, while the upper fuel injection valve 111 and the lower fuel injection valve 98 (see FIG. 2) are provided for each rear throttle portion 91. Further, the respective upper fuel injection valves 108, 111 are supported by the upper valve support member 107 and, at the same time, fuel is supplied to the respective upper fuel injection valves 108, 111 from the upper valve support member 107. In the same manner, the respective lower fuel injection valves 78, 98 are supported by the lower valve support member 105 (see FIG. 2) and fuel is supplied to the lower fuel injection valves 78, 98 from the upper valve support member 107 through the fuel pipes 106, 106 (see FIG. 2) and the lower valve support member 105.

Three front throttle portions 71 are integrally formed in one throttle base 72 (see FIG. 2), while two rear throttle portions 91 are integrally formed in another throttle base 92 (see FIG. 2). Further, the throttle body assembly 38 is a device in which one forward valve shaft 81 penetrates the respective front throttle portions 71, while one rear valve shaft 101 penetrates the respective rear throttle portions 91, and the throttle valve opening control device 140, e.g., a profile thereof indicated by a bold line in FIG. 3, of the present invention is connected to the forward valve shaft 81 and the rear valve shaft 101 by way of a link mechanism 138 acting as a connecting member.

The throttle valve opening control device 140 (hereinafter simply referred to as "throttle control device 140") is a device which is mounted on a connecting member (not shown in the drawing) which connects the throttle bases 72, 92 like a bridge and is arranged between the lower valve support member 105 (see FIG. 2) and the upper valve support member 107. In FIG. 3, numeral 142 indicates a hose connecting portion which is formed on the upper valve support member 107 for connection with a fuel pump (not shown in the drawing) by way of a fuel hose (not shown in the drawing). A throttle opening sensor 143 is connected to an end portion of the rear valve shaft 101 for detecting the opening of the throttle valves 82, 102.

FIG. 4 is a side view of the throttle body assembly according to an embodiment of the present invention. The side view shown in FIG. 4 is a view taken along the line designated by arrow A in FIG. 3. The throttle control device 140 includes an output shaft 151 that is rotated along with the manipulation of a throttle grip (not shown in the drawing) of a handle (not shown) of the motorcycle and the link mechanism 138 that is connected to the output shaft 151.

The linkage or link mechanism 138 includes a first arm member 153 which is mounted on an end portion of the output shaft 151, a first link 154 which has one end thereof mounted on the first arm member 153, a second arm member 155 which is connected to another end of the first link 154 and is mounted on an end portion of the forward valve shaft 81, a second link 156 which has one end thereof connected to the second arm member 155, and a third arm member 157 which is connected to another end of the second link 156 and is mounted on the rear valve shaft 101.

The second arm member 155 is a part on which a front arm portion 161 connected to the first link 154 and a rear arm portion 162 connected to the second link 156 are integrally formed. An arm length L1 of the rear arm portion 162 and an arm length L2 of the third arm member 157 are set equal. By taking these arm lengths L1, L2, an angle made by the rear arm portion 162 and the third arm member 157 and a total length of the second link 156 into consideration, the difference in a rotational angle between the forward valve shaft 81 and the rear valve shaft 101 is set to a small value within a relatively small angular range.

A centerline 165 passes through the center of the intake passage 76 (see FIG. 2) of the front throttle portion 71 and indicates a centerline 166 which passes the center of the intake passage 96 (see FIG. 2) of the rear throttle portion 91. These centerlines 165, 166 are arranged to be inclined such that upper portions thereof approach each other. By imparting an inclination to the centerlines 165, 166, it is possible to decrease the fore-and-aft directional size of the upper portion of the throttle body assembly 38.

Leg portions 167, 168 are provided to the throttle control device 140 for mounting the throttle control device 140 on a connecting member which connects the front throttle portion 71 and the rear throttle portion 91.

FIG. 5 is a cross-sectional view of the throttle control device according to an embodiment of the present invention. This cross-sectional view is taken along line 5—5 in FIG. 4. The throttle control device 140 includes a drum 181 which is connected to a throttle grip (not shown in the drawing) by way of a wire; an input shaft 182 which is mounted in the drum 181 as a rotary shaft; a power transmission device 183 which is connected to the input shaft 182; the above-mentioned output shaft 151 which is held by the power transmission device 183; the link mechanism 138 (see FIG. 4) which is connected to the output shaft 151; an intermediate gear 186 which is meshed with a large gear 184 mounted in the power transmission device 183; a drive gear 187 which is meshed with the intermediate gear 186; a drive motor 188 which is connected to the drive gear 187 and includes an actuator; and a housing case 191 which houses the majority of the above-mentioned input shaft 182, the power transmission device 183, the majority of the output shaft 151, the intermediate gear 186, the drive gear 187 and the drive motor 188.

The drum 181 includes wire grooves 195 for winding the wire. Further, a torsion coil spring 196 is provided between the drum 181 and the housing case 191 and, due to the torsion coil spring 196, the drum 181 is returned in the direction opposite to the direction that the drum 181 is rotated by the throttle grip. That is, the torsion coil spring 196 is a part that generates a resilient force to the side that the throttle valves 82, 102 (see FIG. 2) are closed. The input shaft 182 is a part that is rotatably mounted in the housing case 191 by way of a bearing 198 and an input side bevel gear 201 is integrally formed on an end portion of the input shaft 182.

The power transmission device 183 includes a split-type case portion 206 which is rotatably mounted on the housing case 191 by way of bearings 203, 204, a cruciform support shaft 207 which is mounted on the case portion 206, small bevel gears 208 which are rotatably mounted on the support shaft 207, and the above-mentioned input-side bevel gear 201 and an output-side bevel gear 211 which are meshed with these small bevel gears 208.

The case portion 206 is also a member that is rotatably mounted on the input shaft 182 by way of a bearing 213 and is rotatably mounted on the output shaft 151 by way of a bearing 214. The case portion 206 includes a case portion body 216 that is integrally formed with the above-mentioned large gear 184 and supports the support shaft 207 and a cover portion 217 that is provided to the input shaft 182 side to seal an opening portion of the case portion body 216. Here, numeral 221 indicates bolts for mounting the cover portion 217 to the case portion body 216.

The output-side bevel gear 211 is integrally formed on the output shaft 151. The intermediate gear 186 is rotatably mounted in the housing case 191 by way of bearings 223, 223. The drive gear 187 is rotatably mounted in the housing case 191 by way of a bearing 225 and is connected to a rotary shaft 226 of a drive motor 188 by a bolt 227. The drive motor 188 is configured to be covered with a motor case 231 and is mounted on the housing case 191 together with the motor case 231 using bolts 232. The housing case 191 includes a first case 236 and a second case 237 fastened by bolts 238. An axis 182a of the input shaft 182 and an axis 151a of the output shaft 151 are arranged on a straight line.

The rotary shaft 226 of the drive motor 188 is arranged parallel to the above-mentioned input shaft 182 and output shaft 151. The drive motor 188 which has a cylindrical shape and is elongated in the direction of the rotary shaft 226 is arranged parallel to the input shaft 182 and the output shaft 151. A nut 241 for mounting the drum 181 on the input shaft 182, a bearing 242 which is interposed between an end portion of the output shaft 151 and an end portion of the second case 237 for rotatably supporting the output shaft 151, a collar 243 which is provided around the output shaft 151 between the bearing 214 and the bearing 242, a ring-like spacer 244 which is provided around the output shaft 151 between the bearing 242 and the first arm member 153, a nut 246 for mounting the first arm member 153 on a distal end of the output shaft 151, and lead lines 247, 247 for supplying electricity to the drive motor 188.

The operation of the throttle control device 140 is described in greater detail hereinafter. When the throttle grip is rotated to the side that opens the throttle valves, the rotation of the throttle grip is transmitted to the drum 181 by way of the wire. When the drive motor 188 is stopped, the large gear 184 which is meshed with the drive gear 187 by way of the intermediate gear 186 is in a stopped state. Accordingly, when the input shaft 182 which is connected to the drum 181 is rotated, the rotation of the input shaft 182 is transmitted to the small bevel gears 208 from the input-side bevel gear 201 and, thereafter, is transmitted to the output side bevel gear 211 by way of the small bevel gears 208 thus rotating the output shaft 151. Since the small bevel gears 208, 208 are rotated, the output shaft 151 is rotated in the opposite direction at a rotational speed equal to a rotational speed of the input shaft 182.

When the drive motor 188 is operated so as to rotate the rotary shaft 226 of the drive motor 188 in the same direction as the input shaft 182 (that is, the direction opposite to the rotating direction of the output shaft 151), the large gear 184 is rotated in the same direction as the input shaft 182 and the small bevel gears 208 are revolved while being rotated. Accordingly, the rotation of the output shaft 151 is decreased compared to the rotation of the input shaft 182.

When the drive motor 188 is operated so as to rotate the rotary shaft 226 of the drive motor 188 in the direction opposite to the rotating direction of the input shaft 182, e.g., the same direction as the rotating direction of the output shaft 151, the large gear 184 is rotated in the direction opposite to the direction of the input shaft 182 and the small bevel gears 208 turn while being rotated. Accordingly, the rotation of the output shaft 151 is increased compared to the rotation of the input shaft 182.

The above-mentioned rotating direction and rotational speed of the drive motor 188 are determined based on information such as an engine rotational speed, a transmission position of the transmission, a vehicle speed, a drive wheel speed, a rotating angle of the throttle grip and the like using a map which is stored in a control unit not shown in the drawing.

FIG. 6 is a perspective view of the throttle control device according to an embodiment of the present invention. The drum 181 which winds the wire 251 onto the wire grooves 195 is mounted on the input shaft 182, the output shaft 151 is connected to the input shaft 182 by way of the power transmission device 183, the first arm member 153 is mounted on the distal end of the output shaft 151, one end of the first link 154 is swingably mounted on the first arm member 153, the second arm member 155 is mounted on the forward valve shaft 82 on which the throttle valve 82 is mounted, another end of the first link 154 is mounted on the front arm portion 161 of the second arm member 155, one end of the second link 156 is mounted on the rear arm portion 162 of the second arm member 155, the third arm member 157 and the throttle opening sensor 143 are mounted on the end portion of the rear valve shaft 101 on which the throttle valve 102 is mounted, another end of the second link 156 is mounted on the third arm member 157, the drive gear 187 is meshed with the large gear 184 of the power transmission device 183 by way of the intermediate gear 186, and the rotary shaft 226 of the drive motor 188 is connected to the drive gear 187. A drum angle sensor 253 is connected to the drum 181 for detecting a rotary angle of the drum 181 and the rotary angle of the drum 181 is a value proportional to the rotary angle of the throttle grip.

As explained in conjunction with FIG. 2, FIG. 4 and FIG. 6, the present invention is characterized in that in the throttle valve opening control device 140 in which the throttle body assembly 38 is formed on the intake side of the engine 13, the intake passages 76, 96 are formed in the throttle body assembly 38 and the forward valve shaft 81 and the rear valve shaft 101 are provided to the throttle body assembly 38, the throttle valves 82, 102 which open/close the intake passages 76, 96 are mounted on the forward valve shaft 81 and the rear valve shaft 101 whereby the throttle valve openings are controlled by performing the rotational control of the front and rear valve shafts 81, 101 based on the manipulated variable of the throttle grip, the throttle valve opening control device 140 includes the drum 181 which is connected to the throttle grip by the wire 251, the input shaft 182 which is integrally mounted in the drum 181, the output shaft 151 which is connected to the input shaft 182 by way of the power transmission device 183, the link mechanism 138 which connects the output shaft 151 to the forward valve shaft 81 and the rear valve shaft 101, and drive motor 188 which drives the power transmission device 183 to provide the relative rotation of the output shaft 151 with respect to the input shaft 182, and the input shaft 182 and the output shaft 151 have respective axis 182a (see FIG. 5) and axis 151a (see FIG. 5) thereof arranged on the straight line, the drive motor 188 is arranged parallel to the output shaft 151, and the output shaft 151 and the drive motor 188 are juxtaposed vertically and substantially along centerline 165 of the intake passage 76.

By arranging the respective axes 182a, 151a of the input shaft 182 and the output shaft 151 on the straight line and by vertically juxtaposing the output shaft 151 and the drive motor 188 substantially along the centerline 165 of the intake passage 76, it is possible to make the throttle valve opening control device 140 more compact. Therefore, it is possible to position the throttle valve opening control device 140 closer to the front throttle portion 71 of the throttle body assembly 38 and thereby reducing a projection quantity of the throttle valve opening control device 140 and ultimately the size of the engine 13 on which the throttle valve opening control device 140 is mounted.

The layout structure of a throttle valve opening control device includes the throttle body assembly 38 being formed on the intake side of the engine 13, the intake passages 76, 96 formed in the throttle body assembly 38 and the forward valve shaft 81 and the rear valve shaft 101 being provided to the throttle body assembly 38. The throttle valves 82, 102 which respectively open/close the intake passages 76, 96 are mounted on the forward valve shaft 81 and the rear valve shaft 101. The throttle valve opening control device 140 which controls throttle valve openings by performing a rotational control of the forward valve shaft 81 and the rear valve shaft 101 based on a manipulated variable of a throttle grip is arranged in the engine 13. The throttle valve opening control device 140 includes the input shaft 182 which is connected to the throttle grip side, the output shaft 151 which is connected to the input shaft 182 by way of the power transmission device 183, the link mechanism 138 which connects the output shaft 151 to the forward valve shaft 81 and the rear valve shaft 101, and the drive motor 188 which drives the power transmission device 183 to provide the relative rotation of the output shaft 151 with respect to the input shaft 182. The intake passages 76, 96 include at least one for each intake passage, e.g., two intake passages, and the intake passages 76, 96 are arranged in parallel in the fore-and-aft direction of the engine 13. The throttle valve opening control device 140, particularly, the output shaft 151 and the drive motor 188, are arranged above a plane which includes the respective valve shafts 81, 101 of the intake passages 76, 96. A rotational force is transmitted from the output shaft 151 to the forward valve shaft 81 and the rear valve shaft 101 which are disposed below the output shaft 151.

By arranging the throttle valve opening control device 140 above the plane which includes both valve shafts 81, 101 of the intake passages 76, 96, compared to the conventional arrangement in which a motor for controlling openings of throttle valves is arranged between the throttle valves in front of and behind the engine, the front and rear intake passages 76, 96 of the present invention can be arranged closer to each other. Therefore, the throttle assemble body 38 can be made more compact whereby it is possible to reduce the size of the engine 13 in which the throttle valve opening control device 140 is arranged.

The layout structure of a throttle valve opening control device in which the throttle body assembly 38 is formed on the intake side of the engine 13 includes the intake passages 76, 96 formed in the throttle body assembly 38 and the forward valve shaft 81 and the rear valve shaft 101 provided in the throttle body assembly 38. The throttle valves 82, 102 which respectively open/close the intake passages 76, 96 are mounted on the forward valve shaft 81 and the rear valve shaft 101, and the throttle valve opening control device 140 which controls throttle valve openings by performing a rotational control of the forward valve shaft 81 and the rear valve shaft 101 based on a manipulated variable of a throttle grip is arranged in the engine 13. The throttle valve opening control device 140 includes the input shaft 182 which is connected to the throttle grip side, the output shaft 151 which is connected to the input shaft 182 by way of the power transmission device 183, the link mechanism 138 which connects the output shaft 151 to the forward valve shaft 81 and the rear valve shaft 101, and the drive motor 188 which drives the power transmission device 183 to provide the relative rotation of the output shaft 151 with respect to the input shaft 182. Upper fuel injection valves 108, 111 which inject fuel into the inside of the intake passages 76, 96 are arranged above the intake passages 76, 96 and lower fuel injection valves 78, 98 which inject fuel into the intake ports 127, 133 in the inside of the engine 13 are arranged at lower side portions of the intake passages 76, 96. The throttle valve opening control device 140 is arranged between the upper fuel injection valves 108, 111 and the lower fuel injection valves 78, 98.

By arranging the upper fuel injection valves 108, 111 above the intake passages 76, 96, it is possible to bring respective upper portions of the two intake passages 76, 96 closer to each other. Therefore, the throttle body assembly 38 can be made more compact and it is possible to miniaturize the engine 13 in which the throttle valve opening control device 140 is arranged.

Although the throttle valves are formed with the butterfly valve, the throttle valves are not limited to the butterfly valve type and may be formed with a slide valve type that changes a cross-sectional area of the intake passage in response to the rotary angle of the valve shaft by traversing the intake passage when the valve shaft is rotated.

The present invention exhibits following advantageous effects due to the above-mentioned constitutions. The throttle valve opening control device includes the drum which is connected to the throttle grip by the wire, the input shaft which is integrally mounted in the drum, the output shaft which is connected to the input shaft by way of the power transmission device, the connecting member which connects the output shaft to the valve shafts, and the actuator which drives the power transmission device to provide the relative rotation of the output shaft with respect to the input shaft, wherein the input shaft and the output shaft have respective axes thereof arranged along a straight line. The actuator is arranged parallel to the output shaft, and the output shaft and the actuator are juxtaposed vertically and substantially along the centerline of the intake passage.

Therefore, it is possible to make the throttle valve opening control device more compact and/or it is possible to position the throttle valve opening control device closer to the throttle body to reduce the quantity the throttle valve opening control device projects from the engine. In addition, the overall size of the engine incorporating this throttle valve opening control device can also be reduced.

The layout structure of the throttle valve opening control device can also include the input shaft which is connected to the throttle grip side, the output shaft which is connected to the input shaft by way of the power transmission device, the connecting member which connects the output shaft to the valve shafts, and the actuator which drives the power transmission device to provide the relative rotation of the output shaft with respect to the input shaft, wherein the intake passages include at least two intake passages. The intake passages are arranged in parallel in the fore-and-aft direction of the engine. The throttle valve opening control device is arranged above the plane that includes the respective valve shafts of the intake passages, and the rotational force is transmitted from the output shaft to the valve shafts that are disposed below the output shaft. Compared to the conventional arrangement in which the motor for controlling openings of throttle valves is arranged between the throttle valves in front of and behind the engine, the front and rear intake passages of the present invention can be arranged closer to each other, and the throttle body can be made more compact. Therefore, it is possible to reduce the size of the engine in which the throttle valve opening control device is arranged.

The layout structure of the throttle valve opening control device can also include the input shaft which is connected to the throttle grip side, the output shaft which is connected to the input shaft by way of the power transmission device, the connecting member which connects the output shaft to the valve shafts, and the actuator which drives the power transmission device to provide the relative rotation of the output shaft with respect to the input shaft, wherein upper fuel injection valves which inject fuel into the inside of the intake passages are arranged above the intake passages and lower fuel injection valves which inject fuel into the inside of the engine are arranged at lower side portions of the intake passages. The throttle valve opening control device is arranged between the upper fuel injection valves and the lower fuel injection valves.

By arranging the upper fuel injection valves above the intake passages, it is possible to bring respective upper portions of two intake passages closer to each other and the throttle body can therefore be made more compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A throttle valve opening control device for an intake side of an engine, wherein said engine includes a plurality of intake passages formed in a throttle body, a plurality of valve shafts being provided in the throttle body, a plurality of throttle valves for opening and closing the intake passages are mounted on the valve shafts, whereby throttle valve openings are operatively controlled by a rotational movement of the valve shafts via a throttle grip, said throttle valve opening control device comprising:

a drum being connected to the throttle grip by a wire,
an input shaft which is integrally mounted in the drum,
an output shaft which is operatively connected to the input shaft by a power transmission device,
a connecting member which connects the output shaft to the valve shafts, and
an actuator which drives the power transmission device to provide the relative rotation of the output shaft with respect to the input shaft, wherein the input shaft and the output shaft have respective axes thereof arranged along a straight line, the actuator is arranged in a position parallel to the output shaft, and the output shaft and the actuator are juxtaposed substantially vertically along a centerline of the intake passage.

2. A motorcycle comprising the throttle control device according to claim 1.

3. The throttle valve opening control device according to claim 1, wherein the connecting member includes a link mechanism operatively connecting the output shaft with the valve shafts.

4. The throttle valve opening control device according to claim 3, wherein said link mechanism includes a plurality of linkage arms connecting said output shaft to said valve shafts.

5. The throttle valve opening control device according to claim 1, further comprising a throttle opening sensing operatively connected to a valve shaft.

6. The throttle valve opening control device according to claim 1, further comprising a drive motor operatively connected with gears to the output shaft.

7. The throttle valve opening control device according to claim 1, wherein the power transmission device includes a split-case portion rotatably mounted on the input shaft and on the output shaft by a bearing.

8. A throttle valve opening control device for an engine having a throttle body formed on an intake side of the engine, a plurality of intake passages being formed in the throttle body, a plurality of valve shafts being provided in the throttle body, a plurality of throttle valves for opening and closing the intake passages being mounted on the valve shafts, said throttle valve opening control device comprising:
an input shaft being operatively connected to a throttle grip;
an output shaft being connected to the input shaft by a power transmission device; a
connecting member which connects the output shaft to the valve shafts, and
an actuator which drives the power transmission device to provide a relative rotational movement of the output shaft with respect to the input shaft and via the throttle grip, wherein the intake passages are arranged in parallel in a fore-and-aft direction of the engine, the throttle valve opening control device is arranged above a plane which includes the respective valve shafts of the intake passages, and the rotational movement is transmitted from the output shaft to the valve shafts which are disposed below the output shaft.

9. The throttle valve opening control device according to claim 8, wherein the connecting member includes a link mechanism operatively connecting the output shaft with the valve shafts.

10. The throttle valve opening control device according to claim 9, wherein said link mechanism includes a plurality of linkage arms connecting said output shaft to said valve shafts.

11. The throttle valve opening control device according to claim 8, further comprising a throttle opening sensing operatively connected to a valve shaft.

12. The throttle valve opening control device according to claim 8, further comprising a drive motor operatively connected with gears to the output shaft.

13. The throttle valve opening control device according to claim 8, wherein the power transmission device includes a split-case portion rotatably mounted on the input shaft and on the output shaft by a bearing.

14. A motorcycle comprising the throttle control device according to claim 8.

15. A throttle valve opening control device for an engine having a throttle body formed on an intake side of the engine, a plurality of intake passages being formed in the throttle body, a plurality of valve shafts being provided in the throttle body, a plurality of throttle valves for opening and closing the intake passages being mounted on the valve shafts, upper fuel injection valves for injecting fuel into an interior of the intake passages are arranged above the intake passages and lower fuel injection valves for injecting fuel into an interior of the engine are arranged at lower side portions of the intake passages, said throttle valve opening control device comprising:
an input shaft being operatively connected to a throttle grip;
an output shaft being connected to the input shaft by a power transmission device;
a connecting member which connects the output shaft to the valve shafts; and
an actuator which drives the power transmission device to provide the relative rotation of the output shaft with respect to the input shaft;
wherein the throttle valve opening control device is arranged above the throttle body and between the upper fuel injection valves and the lower fuel injection valves.

16. A motorcycle comprising the throttle control device according to claim 15.

17. The throttle valve opening control device according to claim 15, wherein the connecting member includes a link mechanism operatively connecting the output shaft with the valve shafts.

18. The throttle valve opening control device according to claim 17, wherein said link mechanism includes a plurality of linkage arms connecting said output shaft to said valve shafts.

19. The throttle valve opening control device according to claim 15, further comprising a throttle opening sensing operatively connected to a valve shaft.

20. The throttle valve opening control device according to claim 15, wherein the power transmission device includes a split-case portion rotatably mounted on the input shaft and on the output shaft by a bearing.

* * * * *